United States Patent [19]

Kajitani

[11] 3,990,234

[45] Nov. 9, 1976

[54] EXHAUST GAS REACTION DEVICE FOR MULTI-CYLINDER INTERNAL COMBUSTION ENGINE

[75] Inventor: Ikuo Kajitani, Niiza, Japan

[73] Assignee: Honda Giken Kogyo Kabushiki Kaisha, Tokyo, Japan

[22] Filed: Sept. 30, 1975

[21] Appl. No.: 618,001

[30] Foreign Application Priority Data

Sept. 30, 1974  Japan.............................. 49-111696

[52] U.S. Cl.................................. 60/282; 60/323; 123/122 AC

[51] Int. Cl.² ......................................... F02B 75/10

[58] Field of Search ............. 60/282, 322, 314, 312, 60/302, 323; 123/122 AB, 122 AC, 325 T

[56] References Cited
UNITED STATES PATENTS

| | | |
|---|---|---|
| 2,257,631 | 9/1941 | Wahlberg.............................. 60/323 |
| 3,695,238 | 10/1972 | Boerma................................ 60/314 |
| 3,881,316 | 5/1975 | Bunda................................. 60/302 |
| 3,916,850 | 11/1975 | Date............................ 123/122 AB |

*Primary Examiner*—Douglas Hart
*Attorney, Agent, or Firm*—Lyon & Lyon

[57] ABSTRACT

An exhaust gas reaction chamber has an inner chamber surrounded and encompassed by an outer chamber, and a "U" shaped pipe extends through both chambers and has a single feed port positioned within the inner chamber. Both ends of the pipe receive exhaust gases discharged through two paired exhaust passages discharging through a single port. A thick wall housing surrounds the reaction chamber but is spaced from the thin metal walls which form the reaction chamber. The outer chamber heats a lean intake mixture supplied to the main combustion chambers of the engine and heats a rich mixture suppled to auxiliary combustion chambers of the engine.

10 Claims, 3 Drawing Figures

3,990,234

EXHAUST GAS REACTION DEVICE FOR MULTI-CYLINDER INTERNAL COMBUSTION ENGINE

This invention relates to internal combustion engines and is particularly directed to an improved exhaust gas reaction device for minimizing CO and HC in the exhaust gases discharged from the engine.

It is conventional practice to connect the exhaust port of each cylinder through a separate exhaust pipe to a thermal reaction chamber having a relatively large volume. In such a device there is one exhaust pipe for each cylinder, and each exhaust pipe is heated only by the exhaust gas from that cylinder, so that when the pulse of exhaust gas ceases until the next cycle, the temperature of the exhaust gases in that pipe lower with time. Subsequent pulses of exhaust gas through the same exhaust pipe are also cooled in this manner, to the detriment of the thermal reaction for minimizing discharge of HC and CO into the atmosphere.

In accordance with this invention, an exhaust gas reaction device is provided which improves the reaction of HC and CO by maintaining a high temperature in the reactor, and an important feature contributing to this result is the provision of a single pipe having a feed port positioned in a side wall thereof equidistant from the ends of the pipe. Each end of the pipe receives exhaust gas discharged from more than one cylinder of the engine. An exhaust gas reaction chamber has an inner chamber in communication with the single feed port and has a second chamber encircling the inner chamber and receiving exhaust gases therefrom. Heat losses through walls of the chambers are minimized by the provision of a thick wall housing enclosing but spaced from the walls of the chambers.

Other and more detailed objects and advantages will appear hereinafter.

Figure 1:
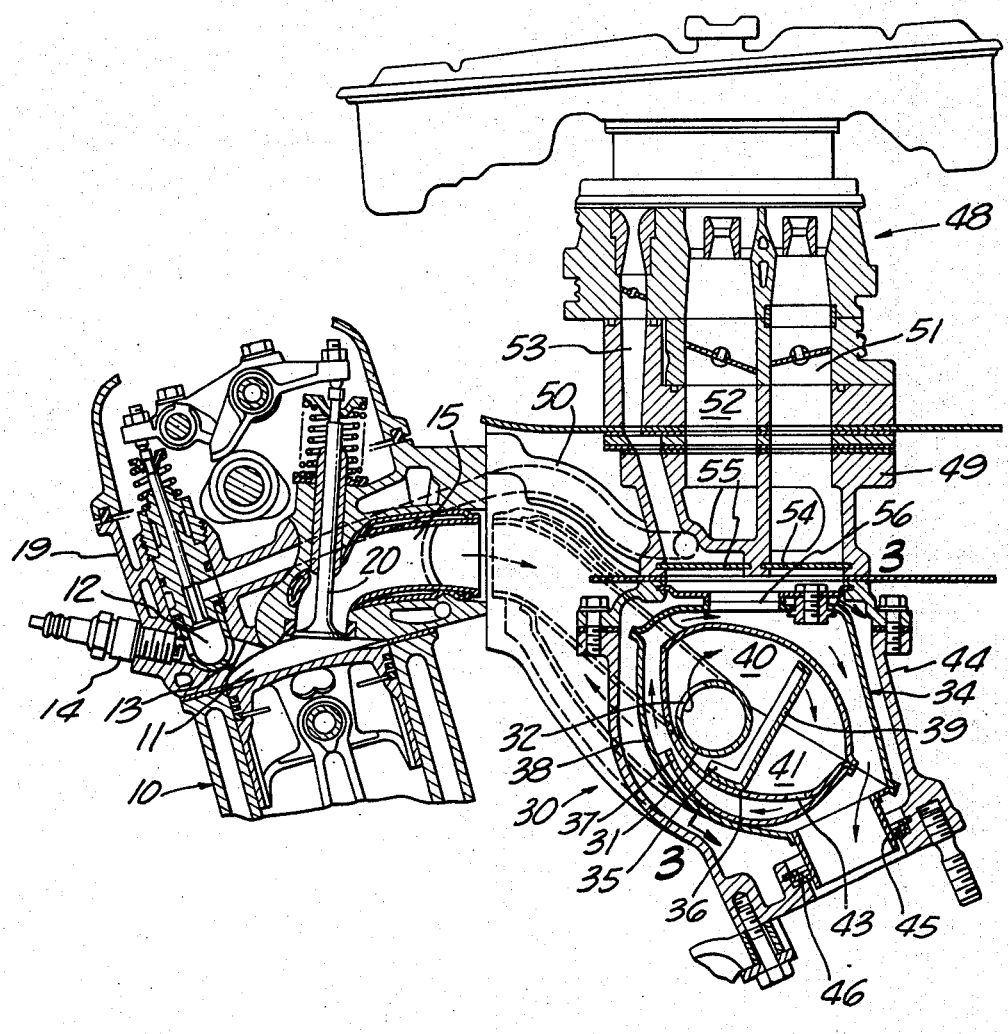
FIG. 1 is a sectional elevation showing a preferred embodiment of this invention.
Figure 2:
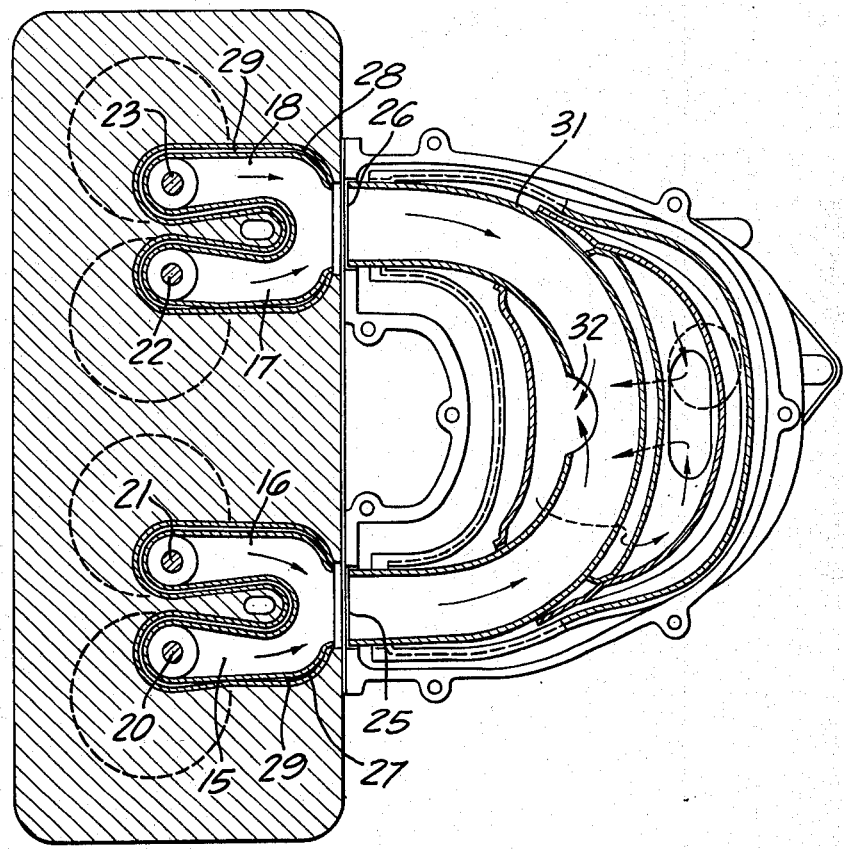
FIG. 2 is a sectional plan view.

Referring to the drawings, the internal combustion engine 10 has four cylinders each provided with a main combustion chamber 11 and an auxiliary combustion chamber 12 connected by a torch opening 13. A spark plug 14 is positioned to ignite an air-fuel mixture in the auxiliary chamber 12. Four exhaust passages 15, 16, 17 and 18, each associated with one of the main combustion chambers 11, are provided in the engine head 19. Exhaust valves 20, 21, 22 and 23 control discharge of exhaust gases through the exhaust passages 15, 16, 17 and 18, respectively.

The exhaust passages 15 and 16 are paired together and have a single exhaust port 25. Similarly, the exhaust passages 17 and 18 are paired together and have a single exhaust port 26. A dual liner 27 forms the exhaust passages 15 and 16, and a similar liner 28 forms the exhaust passages 17 and 18. Each of these dual liners is formed of heat resistant metal such as stainless steel, and each has a double wall construction with an air space 29 between the walls to serve insulation, and to minimize escape of exhaust heat to the water-cooled head 19 of the engine.

The exhaust manifold generally designated 30 includes a "U" shaped pipe 31 which extends from the exhaust port 25 to the exhaust port 26. An exhaust feed port is formed by an opening 32 in the wall of the "U" shaped pipe 31. This opening 32 is equidistant from the exhaust openings 25 and 26, and has substantially the same effective cross section area as the cross section area of the "U" shaped pipe 31.

Figure 3:
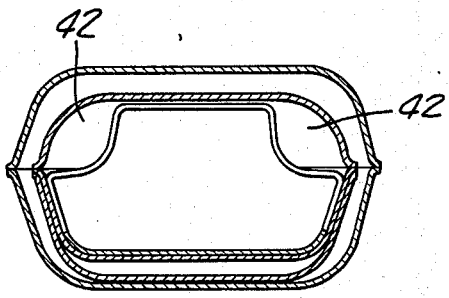
FIG. 3 is a sectional detail taken substantially on the lines 3—3 as shown in FIG. 1.

An exhaust gas reaction chamber generally designated 34 is provided to receive exhaust gases delivered through the single feed port 32, and as shown in the drawings this reaction chamber 34 includes a first chamber 35 formed by the walls 36 and a second chamber 37 formed by the walls 38. The walls 36 of the first chamber are spaced within and surrounded by walls 38 of the second chamber 37. A baffle 39 divides the first chamber into an upstream portion 40 and a downstream portion 41. Openings 42 (FIG. 3) extend between the upstream and downstream portions of the first chamber 35, and one or more openings 43 connect the first chamber 35 to the second chamber 37. The walls 36 and 38 of the reaction chamber are thin and are formed of heat resistant metal such as stainless steel. The reaction chamber 34 and the "U" shaped pipe 31 are enclosed by and spaced within a thick wall housing 44. An exhaust tube 45 fixed to the walls 38 of the second chamber 37 passes through a sealing assembly 46 in the housing 44 to permit thermal expansion.

A carburetor assembly 48 is mounted on a riser 49 which forms a part of the intake manifold 50. The carburetor assembly 48 has a first intake passage 51 and a second intake passage 52 for supplying a lean air-fuel mixture to each of the main combustion chambers 11. The second intake passage 52 comes into action only during high performance operation of the engine 10. A third intake passage 53 of the carburetor assembly 48 supplies a rich air-fuel mixture to the auxiliary chambers 12. Heat transfer plates 54 and 55 are provided for heating the lean air-fuel mixture supplied by the first intake passage 51 and the rich intake mixture supplied by the third intake passage 53. An opening 56 in the walls 38 forming the second chamber 37 permits the exhaust gases to heat the plates 54 and 55. The lean air-fuel mixture supplied by the second intake passage 52 is not heated.

In operation, exhaust gas is discharged into the exhaust passages 15, 16, 17 and 18 as the exhaust valves 20, 21, 22 and 23, respectively, are operated in predetermined sequence by conventional means. The "U" shaped pipe 31 is heated rapidly and remains hot as it receives the exhaust gas pulses in sequence. The walls 36 of the first chamber 35 and the walls 38 of the second chamber 37 have portions which contact the "U" shaped pipe 31, but these walls 36 and 38 are, in the main, spaced from the relatively cool enclosing housing 44. Accordingly, exhaust gas is delivered through the single feed port 32 at a high temperature into the reaction chamber 34. Although exhaust gas discharged through one of the spaced ports 25 and 26 begins to cool when exhaust gas flow stops momentarily, the discharge of exhaust gas through the other exhaust port reheats the cooling exhaust gas. The alternating pulses of exhaust gas received in opposite ends of the "U" shaped pipe 31 serve to maintain at high temperature the gases emitted through the feed port 32.

The hot exhaust gases pass in sequence from the single feed port 32 into the upstream portion 40 of the first chamber 35 and then through openings 42 into the downstream portion 41 of that chamber. The gases then pass through the opening 43 into the second chamber 37 which surrounds the first chamber 35. The heat of the gases in the second chamber 37 passes through the opening 56 to heat the air-fuel mixtures in the first and third intake passages 51 and 53 through the heat transfer plates 54 and 55, respectively. The hot gases in the second chamber 37 are discharged through the exhaust tube 45. The high temperature of the exhaust gases and the residence time within the reaction chamber 34 serve to reduce the amounts of CO and HC discharged into the atmosphere.

From the foregoing description it will be understood that multiple exhaust passages are joined to form a lesser number of exhaust ports and that these ports are connected to a single feed port into a reaction chamber. In this way the gases delivered through the feed port are maintained at high temperature. The dynamic pressure in one portion of the pipe leading to the feed port acts on the lower pressure of another portion of the pipe to limit the cooling of exhaust gases. The high temperature of the exhaust gases in the reaction chamber and the residence time of the gases therein cooperate to produce substantial reductions in the amounts of HC and CO discharged into the atmosphere.

Having fully described our invention, it is to be understood that we are not to be limited to the details herein set forth, but that our invention is of the full scope of the appended claims.

We claim:

1. In an internal combustion engine having a plurality of cylinders, the combination of: exhaust passages each communicating with one of the cylinders, respectively, exhaust ports each connected to and receiving exhaust gases from a plurality of exhaust passages, a pipe connecting the exhaust ports and having a single feed port positioned equidistant from said exhaust ports, an exhaust gas reaction chamber having thin walls formed of heat resistant metal, said walls of the reaction chamber encircling said feed port and a portion of said pipe on each side of the feed port, a thick wall housing encompassing but spaced from the walls of the reaction chamber, and a discharge tube connected to the reaction chamber for conveying exhaust gases outside of said housing.

2. The combination set forth in claim 1 in which the reaction chamber comprises walls forming an inner chamber surrounded by an outer chamber, means establishing communication between the chambers, the feed port communicating with the inner chamber and the discharge tube communicating with the outer chamber.

3. In an internal combustion engine having a plurality of cylinders, the combination of: exhaust passages each communicating with one of the cylinders, respectively, two exhaust ports each connected to and receiving exhaust gases from a plurality of exhaust passages, a "U" shaped pipe having one end connected to one of the exhaust ports and having its other end connected to the other of said exhaust ports, said "U" shaped pipe having a single feed port positioned equidistant from said exhaust ports, an exhaust gas reaction chamber having thin walls formed of heat resistant metal, said walls of the reaction chamber forming a first chamber encircling said feed port and a portion of the "U" shaped pipe on each side of the feed port, said reaction chamber having additional thin walls formed of heat resistant metal encircling the first chamber and defining a second chamber, an opening establishing communication between the first chamber and the second chamber, and a discharge tube connected to the second chamber.

4. The combination set forth in claim 3 in which a baffle divides the inner chamber into an upstream portion and a downstream portion, the feed port communicating with the upstream portion, and said opening communicating with the downstream portion.

5. The combination set forth in claim 3 in which the effective cross section of the feed port is substantially equal to that of the "U" shaped pipe.

6. The combination set forth in claim 3 in which the exhaust passages are lined with heat resistant metal to minimize loss of heat.

7. In an internal combustion engine having four cylinders in line, the combination of: four exhaust passages each communicating with one of the cylinders, respectively, a common exhaust port connected to and receiving exhaust gases from two adjacent exhaust passages, a second common exhaust port connected to and receiving exhaust gases from another two adjacent exhaust passages, a "U" shaped pipe having one end connected to one of the exhaust ports and having its other end connected to the other of said exhaust ports, said "U" shaped pipe having a single feed port positioned equidistant from said exhaust ports, an exhaust gas reaction chamber having thin walls formed of heat resistant metal, said walls of the reactor forming a first chamber encircling said feed port and a portion of the "U" shaped pipe on each side of the feed port, said reaction chamber having additional thin walls formed of heat resistant metal encircling the first chamber and defining a second chamber, means establishing communication between the first chamber and the second chamber, and a discharge tube connected to the second chamber.

8. In a multi-cylinder internal combustion engine of the type having an auxiliary combustion chamber associated with each main combustion chamber and connected thereto by a torch opening, an exhaust manifold comprising a thin-wall reaction chamber enveloped by and spaced within a thick-wall housing, means including an intake manifold for supplying a lean air-fuel mixture to the main combustion chambers and a rich air-fuel mixture to the auxiliary combustion chambers, exhaust passages each communicating with one of the cylinders, respectively, two exhaust ports each connected to and receiving exhaust gases from a plurality of exhaust passages, a "U" shaped pipe having one end connected to one of the exhaust ports and having its other end connected to the other of said exhaust ports, said "U" shaped pipe having a feed port positioned equidistant from said exhaust ports, said reaction chamber encircling said feed port and a portion of the "U" shaped pipe on each side of the feed port, means whereby said reaction chamber may heat at least one of said air-fuel mixtures, and a discharge tube connected to said reaction chamber for conveying exhaust gases outside of said housing.

9. The combination set forth in claim 8 in which the engine has four cylinders in line and four exhaust passages each communicating with one of the cylinders, respectively, and each exhaust port receiving exhaust gases from two exhaust passages, respectively.

10. In a four-cylinder internal combustion engine of the type having an auxiliary combustion chamber associated with each main combustion chamber and connected thereto by a torch opening, an exhaust manifold comprising a reaction chamber enveloped by and spaced within a thick-wall housing, means including an intake manifold for supplying a lean air-fuel mixture to the main combustion chambers and a rich air-fuel mixture to the auxiliary combustion chambers, four exhaust passages each communicating with one of the cylinders, respectively, two exhaust ports each connected to and receiving exhaust gases from two exhaust passages, respectively, a "U" shaped pipe having one end connected to one of the exhaust ports and having its other end connected to the other of said exhaust ports, said "U" shaped pipe having a feed port positioned equidistant from said exhaust ports, said reaction chamber having thin walls defining an inner chamber surrounded by an outer chamber, said walls being formed of heat resistant metal, said inner chamber of the reaction chamber encircling said feed port and a portion of the "U" shaped pipe on each side of the feed port, means whereby said outer chamber may heat at least one of said air-fuel mixtures, and a discharge tube connected to said outer chamber for conveying exhaust gases outside of said housing.

\* \* \* \* \*